No. 766,504. PATENTED AUG. 2, 1904.
I. KITSEE.
METHOD OF PRODUCING ELEMENTS FOR ELECTRIC CELLS.
APPLICATION FILED APR. 14, 1902. RENEWED JUNE 16, 1904.
NO MODEL.
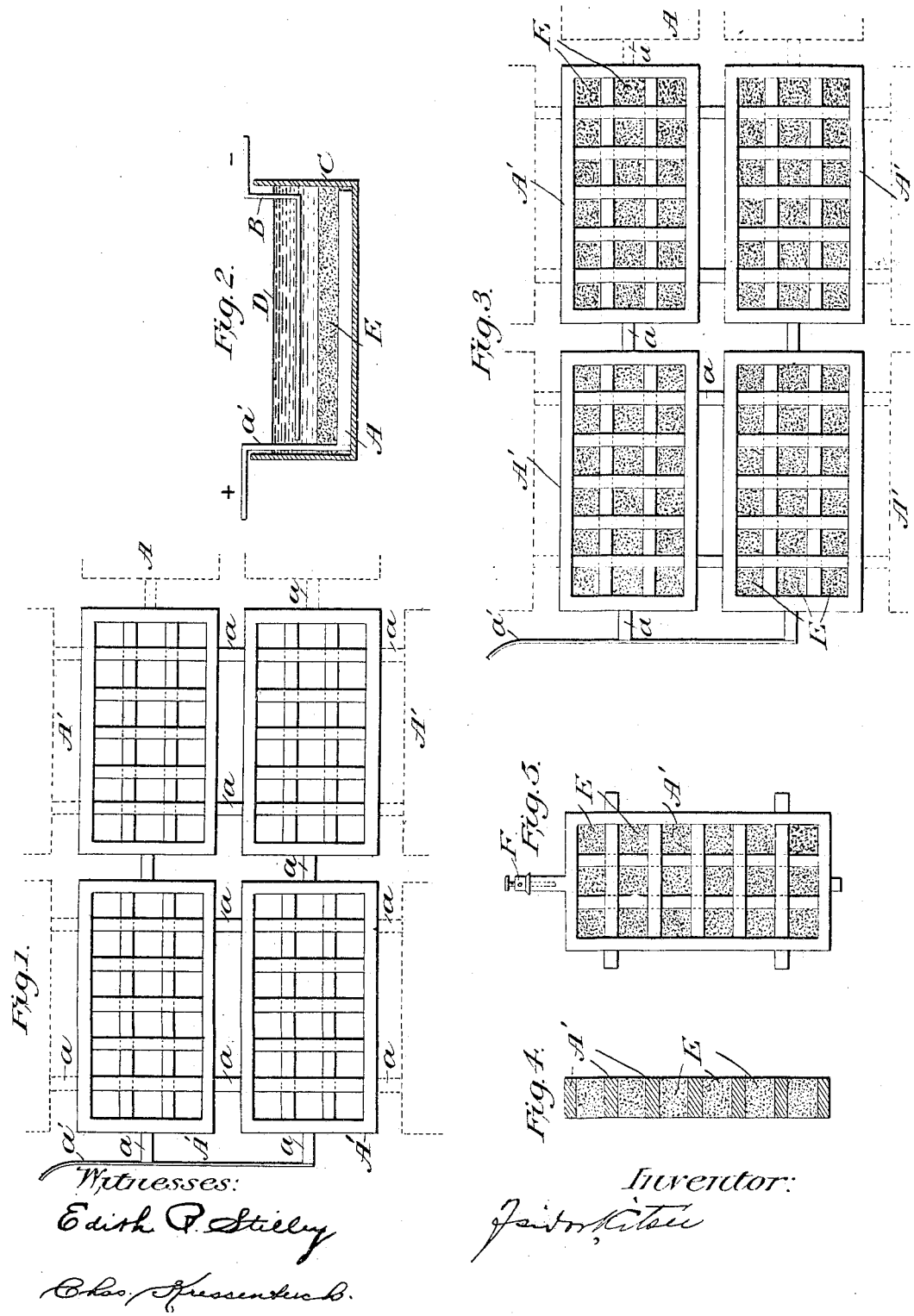

No. 766,504. Patented August 2, 1904.

UNITED STATES PATENT OFFICE.

ISIDOR KITSEE, OF PHILADELPHIA, PENNSYLVANIA.

METHOD OF PRODUCING ELEMENTS FOR ELECTRIC CELLS.

SPECIFICATION forming part of Letters Patent No. 766,504, dated August 2, 1904.

Application filed April 14, 1902. Renewed June 16, 1904. Serial No. 212,895. (No model.)

*To all whom it may concern:*

Be it known that I, ISIDOR KITSEE, of the city and county of Philadelphia, State of Pennsylvania, have invented certain new and useful Improvements in the Method of Producing Elements for Electric Cells, of which the following is a specification.

My invention relates to the method of producing elements for electric cells, and has more special reference to the production of electrodes of limited area—such, for instance, as are used in small secondary and primary cells.

In small secondary and more specially in small primary cells adapted to be used for open-circuit work, as bells, annunciators, &c., both elements have a comparatively small capacity, and in such cells where the negative element consists of a high oxid of lead electrically produced and a support of lead or lead alloy into the spaces of which the depolarizing material is pressed such support should also be provided with a film of high oxid electrically produced, as this film will greatly retard the local action otherwise due to the difference of potential between the metallic lead and the high oxid. In practice these small electrodes are usually produced in one of two ways. Either the material designed to become the depolarizer—the low oxid of lead, litharge—is pasted into the empty spaces and then the whole electrode charged up, as is well known in the art of secondary batteries, or the litharge is in its free state placed in an electrolytic cell, using a lead as conductor, and therein charged up till it has reached the highest state of oxidation. In this case the support is generally charged up separately and then the high oxid pressed into its spaces. In both cases the handling of the separate small electrodes is troublesome and expensive; and it is the aim of my invention to produce the negative electrodes for such cells in a more economical and easier manner.

The underlying principle of my invention lies in the production of a series of supports as one mechanical unit, the charging up of said series either with or without the material designed to be depolarizer as one unit, and the breaking up of said unit into a series of separate electrodes.

Referring to the drawings, Figure 1 is a plan view of a series of supports formed as one mechanical unit. Fig. 2 is a longitudinal section of an electrolytic cell wherein the support as shown in Fig. 1 is used as the conductor for the purpose of charging up the litharge or other salt of lead. Fig. 3 is a plan view of a series of supports having their spaces filled with the material designed to become the depolarizer. Fig. 4 is a plan view of a finished electrode. Fig. 5 is a section of the same.

A is the support as a unit, of which A' represents the individual supports; $a$, the lugs connecting different supports together. $a'$ is the lug to be used as a connector for the purpose of connecting these supports to the charging-current.

E is the depolarizing material.

C represents the containing vessel; D, the liquid contained therein; B, the element designed to be connected to the negative pole of the charging-current when the support E is connected to the lug $a'$ to the positive pole of the charging-current. The unity of the different supports is not broken till the spaces of the same are filled with the charged-up material.

Should that plan be carried out wherein the depolarizing or active material is pasted into the spaces as a low oxid, then the so-prepared element is charged up in a manner as secondary elements are usually charged up; but if the other plan is used—that is, if the litharge or other salt of lead is separately charged— then the support A may be used as the conductor or blank for the purpose of conveying the current to the electrolytic cell. In all cases the unity, as said above, is preserved till the element is in its finished state. Then the lugs $a$ are cut, and one of said lugs is provided with the necessary binding-post, in the drawings F, so as to utilize the same in a primary or secondary cell.

Having now described my invention, what I claim as new, and desire to secure by Letters Patent, is—

1. The method of producing economically elements for electrical cells which consists in first producing a series of supports for said elements, as one mechanical unit, in second, providing the surface of said electrodes electrically with a high oxid, in third, providing the space of said supports with electrically-charged high oxid, and in fourth, severing said supports into a series of separate electrodes and providing each of same with means to connect the same to a circuit-wire.

2. The method of producing elements for electric cells, said method consisting in the production of the supports for a series of elements as one mechanical unit, providing said supports electrically with a film of high oxid and the spaces therein with highly-oxidized compound of lead, separating said supports from each other and providing each with separate means to connect the same to an electric circuit.

3. The method of producing elements for electric cells which consists in producing a series of supports for said elements as one mechanical and electrical unit, in utilizing said supports as conductors in an electrolytic cell for the purpose of producing a high oxid of lead, in providing the spaces in said supports with part of said high oxid, in severing said supports into a series of separate electrodes, and providing each with means to connect the same to a circuit.

4. In the method of producing elements for electric cells, the following steps to wit:—first, producing the metallic support for a series of such elements as one mechanical and electrical unit, second, providing the spaces with a depolarizing material and the support itself with a film of peroxid, and third, cutting said unit into a series of separate elements and providing each with means to connect the same to a circuit.

In testimony whereof I hereby sign my name, in the presence of two subscribing witnesses, this 4th day of March, A. D. 1902.

ISIDOR KITSEE.

Witnesses:
EDITH R. STILLEY,
CHAS. KRESSENBUCH.